(12) United States Patent
Gronewald

(10) Patent No.: US 7,086,197 B1
(45) Date of Patent: Aug. 8, 2006

(54) METHOD AND APPARATUS FOR DISPENSING TERMITICIDE

(76) Inventor: David Gronewald, P.O. Box 270073, Denton, TX (US) 75027-0073

( * ) Notice: Subject to any disclaimer, the term of this patent is extended or adjusted under 35 U.S.C. 154(b) by 0 days.

(21) Appl. No.: 10/912,755

(22) Filed: Aug. 5, 2004

(51) Int. Cl.
*A01M 1/20* (2006.01)
*A01M 17/00* (2006.01)

(52) U.S. Cl. ..................... 43/132.1; 43/124
(58) Field of Classification Search ............ 43/132.1, 43/124; 239/271, 272
See application file for complete search history.

(56) References Cited

U.S. PATENT DOCUMENTS

| | | | | |
|---|---|---|---|---|
| 1,795,488 A * | 3/1931 | Hill | ........ | 43/124 |
| 2,059,095 A * | 10/1936 | Fellman | ........ | 43/124 |
| 2,246,731 A * | 6/1941 | Hill | ........ | 43/124 |
| 2,842,892 A * | 7/1958 | Aldridge et al. | ........ | 43/124 |
| 2,915,848 A * | 12/1959 | Griffin | ........ | 43/124 |
| 2,981,025 A * | 4/1961 | Woodson | ........ | 43/124 |
| RE25,080 E * | 11/1961 | Griffin | ........ | 43/124 |
| 3,124,893 A * | 3/1964 | Glenn | ........ | 43/124 |
| 3,151,746 A * | 10/1964 | Reustle et al. | ........ | 43/124 |
| 3,209,485 A * | 10/1965 | Griffin | ........ | 43/124 |
| 3,330,062 A * | 7/1967 | Carter | ........ | 43/124 |
| 3,513,586 A * | 5/1970 | Gushue et al. | ........ | 43/124 |
| 3,602,248 A * | 8/1971 | Peacock | ........ | 43/124 |
| 3,676,949 A * | 7/1972 | Ramsey | ........ | 43/124 |
| 3,782,026 A * | 1/1974 | Bridges et al. | ........ | 43/124 |
| 3,909,975 A * | 10/1975 | Basile | ........ | 43/124 |
| 3,911,611 A * | 10/1975 | Brinker | ........ | 43/124 |
| 4,028,841 A * | 6/1977 | Lundwall | ........ | 43/124 |
| 4,040,215 A * | 8/1977 | Totsuka | ........ | 43/132.1 |
| 4,625,474 A * | 12/1986 | Peacock et al. | ........ | 43/124 |
| 4,742,641 A * | 5/1988 | Cretti | ........ | 43/132.1 |
| 4,858,375 A * | 8/1989 | Mountain | ........ | 43/124 |
| 4,893,434 A * | 1/1990 | Knipp et al. | ........ | 43/124 |
| 5,007,197 A * | 4/1991 | Barbett | ........ | 43/124 |
| 5,184,418 A * | 2/1993 | Fletscher | ........ | 43/132.1 |
| 5,317,831 A * | 6/1994 | Fletscher | ........ | 43/124 |
| 5,347,749 A * | 9/1994 | Chitwood et al. | ........ | 43/132.1 |
| 5,361,533 A * | 11/1994 | Pepper | ........ | 43/132.1 |
| 5,378,086 A * | 1/1995 | Campbell et al. | ........ | 43/124 |
| 5,394,642 A * | 3/1995 | Takaoka | ........ | 43/124 |
| 5,819,466 A * | 10/1998 | Aesch et al. | ........ | 43/124 |
| 5,881,494 A * | 3/1999 | Jenkins | ........ | 43/124 |

(Continued)

FOREIGN PATENT DOCUMENTS

FR        2199937 A * 5/1974

(Continued)

*Primary Examiner*—Darren W. Ark
(74) *Attorney, Agent, or Firm*—John F Bryan

(57) ABSTRACT

A termiticide dispensing system, installed prior to pouring the slab foundation of a building, has a plurality of tubular units of minimal length, each having a single inlet and a single outlet, positioned and secured so that the inlet end will extend above the slab, in a location accessible after building completion, and the outlet end will extend through the slab to the underlying soil adjacent a water or drain line, so that a controlled quantity of termiticide may be dispensed through the slab, directly to each potential termite access point.

8 Claims, 2 Drawing Sheets

U.S. PATENT DOCUMENTS

| | | | |
|---|---|---|---|
| 5,927,024 A | 7/1999 | Toutountzis et al. | |
| 5,937,572 A * | 8/1999 | Neumann | 43/132.1 |
| 5,960,584 A * | 10/1999 | Aesch, Jr. | 43/124 |
| 6,047,498 A * | 4/2000 | Mann | 43/132.1 |
| 6,070,357 A * | 6/2000 | Hartill et al. | 43/132.1 |
| 6,088,950 A * | 7/2000 | Jones | 43/124 |
| 6,098,900 A * | 8/2000 | Smith | 239/201 |
| 6,199,770 B1 * | 3/2001 | King et al. | 43/132.1 |
| 6,397,518 B1 * | 6/2002 | Mann | 43/132.1 |
| 6,446,383 B1 * | 9/2002 | Hoshall | 43/132.1 |
| 6,463,694 B1 * | 10/2002 | Manciet | 43/132.1 |
| 6,493,987 B1 * | 12/2002 | Aesch et al. | 43/132.1 |
| 6,564,504 B1 * | 5/2003 | Hoshall | 43/132.1 |
| 6,708,444 B1 * | 3/2004 | Aesch, Jr. | 43/132.1 |
| 6,782,655 B1 * | 8/2004 | Hoshall | 43/132.1 |

FOREIGN PATENT DOCUMENTS

| | | | |
|---|---|---|---|
| JP | 10-56936 A | * | 3/1998 |
| JP | 10-146147 A | * | 6/1998 |
| JP | 2001-299182 A | * | 10/2001 |
| JP | 2002-51683 A | * | 2/2002 |
| JP | 2003-116443 A | * | 4/2003 |
| WO | WO 90/14004 | * | 5/1990 |

* cited by examiner

METHOD AND APPARATUS FOR DISPENSING TERMITICIDE

TECHNICAL FIELD

The present invention relates to the field of treatment for termite infestation control and elimination.

BACKGROUND

A majority of homes and many commercial buildings have a wooden structural frame, wooden interior members and often, have full at least partial wooden or cellulose based exteriors. In many ways, wood is an ideal construction material. It is in plentiful supply, relatively inexpensive and easily worked. Properly cared for, wooden buildings can last for centuries. However, in locales where subterranean termites live and breed, proper care can be difficult to achieve. These termites must have access to water on a regular basis, so that their ideal environment has wood and moisture in close proximity. In a building, this will be anywhere moist soil lies in the proximity of potential termite access to wood. Thus, in construction on a concrete slab, every penetration of the slab by a water line or drain becomes a point of potential termite access. Chlordane, a relatively inexpensive chemical, which provided truly long term protection against termites, with one initial application, was available until the late 1980's. After the EPA banned chlordane in 1988, termite control became a much more challenging a problem because of the limited life and efficacy of available termiticides. These termiticides were not only less effective than chlordane but also, far more expensive. Chemical degradation and leaching conspired to make treatment results unpredictable at best and the termite treatment industry struggled through a difficult period as a result of the EPA action. The termiticide art has advanced since 1988 but even so, no available treatment is expected to last for more than five years and annual inspections are recommended in case more frequent treatment is necessary.

Post-construction termite treatments or re-treatments are expensive, labor intensive procedures, wherein holes are drilled every 12" to 24" around the perimeter of the building and also adjacent to any problem areas in the building interior, for injection of termiticide. The interior problem areas are usually in bathrooms, kitchens and wet bars, where unsightly holes must be drilled in a ceramic tile or wood floor covering to penetrate the slab foundation. Over-treatment is necessary, since it is difficult to determine the location of termite entry with any precision, and it is difficult to deliver termiticides to the precise entry location in any case. Such termite treatments are necessarily less effective than would be treatment of the underlying soil before pouring the foundation, and can only be considered to be a reliable deterrent for one year.

Various systems for dispensing termiticide in post-construction treatments have been disclosed. In general, these systems teach the injection of termiticide at a single inlet, with perforated piping or a multiplicity of outlet holes arranged for distribution beneath the slab. Significant problems encountered in such systems have been clogging of the outlets by particles of the fill material and soil underlying the slab, and uneven distribution of the termiticide. A multiplicity of perforations will tend to bleed off the termiticide before it has traveled the full length of the pipe. Even when the pipe is not perforated, unless it is set at the proper gradient, termiticide will not flow to the targeted termite entries. These problems can be offset to some degree by flooding the system with an excess of termiticide under sufficient pressure to overcome pressure losses between the inlet and any given termite entry point. Soil permeability varies widely from one locality to the next. In addition, the underlying soil and sand fill at a construction site will be quite different in this regard. As a result, there is no way to judge the amount of termiticide dispensed to any particular area. The termiticide may go into highly permeable sand at some point and never reach deeper into the system. In any event, the surplus volume of termiticide required to simply fill the length of the piping is essentially wasted.

In actual practice, the construction of foundation slabs introduces some problems that have been ignored in prior teachings of the termite treatment art. For instance, post-tensioned slabs, which have come into common usage in recent years, include a grid pattern of reinforcing beams integral to the underside of the slab, which help carry the loads imposed by cable tension forces. These beams break the fill area under the slab into isolated pockets, making post-construction termiticide treatments all the more difficult. Another slab construction detail not addressed in prior art is the treatment of bathtub plumbing leave-outs, wherein a portion of the slab directly beneath a bathtub is blocked out to provide dimensional flexibility for plumbing connections. As a result, termites have access through the leave-out opening from underlying fill to the wooden plate and studs at the back side of the tub.

A first object of the present inventions therefore, is to provide method and apparatus for effective, uniform post-construction dispensing of termiticides. A second object is to reduce the labor and material expenses of re-treatment. A third object is eliminate the waste of materials and adverse environmental potential of over-treatment and yet other objects are to provide means for more effective treatment of post-tensioned slabs and to eliminate floor covering damage incurred in post-construction treatment.

SUMMARY OF THE INVENTION

The present inventions contemplate improved methods and apparatus for use in the application of termiticides. These inventions relate to or employ some steps and apparatus well known in the termite treatment arts and therefore, not the subject of detailed discussion herein. The present inventions address the aforesaid objectives in a preferred embodiment described below, employing methods and apparatus applicable to a broad range of specific applications. The present inventions recognize that the cost of treating a foundation more extensively than at termite access points cannot be justified.

A preferred embodiment for dispensing termiticides according to the present inventions utilizes a plurality of individual tubular units, each having a capped inlet end and an open dispensing end. These tubular units are put in place prior to pouring the foundation slab, secured so that the capped inlet end will extend above the slab in an accessible location, close to a water or drain line penetration point. Each delivery end is positioned in the underlying fill material, adjacent to a slab penetration point. The tubular units are made as short as is practical, consistent with providing good access to the inlet ends, in order to minimize the waste of termiticide.

The dispensing ends may be plain or may be equipped with nozzles for aiming the injected termiticide in a preferred direction. After finishing the foundation slab, the interior and exterior walls are erected around the inlet ends of the tubular units, with provision for subsequent injection of termiticide.

A significant benefit realized by having but one outlet for each tubular unit is that any plugging of the single outlet by fill material, no matter whether it has a plain end or a directional nozzle, will be readily cleared by the injection of termiticide. Another significant benefit is that termiticide is dispensed to individual termite entry points in a controlled quantity, regardless of soil permeability and rate of absorption.

For practical reasons, as well as concern over legal liability, treatment providers require that any termiticide dispensing hole that is made in the slab be positively sealed against chemical leakage into the building interior. Therefore, a preferred embodiment of the invention has an elastomeric, radially extending gasket fitted tightly around the tubular body of the unit. The periphery of the essentially flat gasket has a circular, "O" ring-like, cross-section, so as to act as an impermeable seal around the tubular body and positively prevent migration of treatment chemicals into the building interior.

BRIEF DESCRIPTION OF THE DRAWINGS

The accompanying drawings are incorporated into the specification to assist in explaining the present inventions. The drawings illustrate preferred and alternative examples of how the inventions can be made and used and are not to be construed as limiting the inventions to only those examples illustrated and described. The various advantages and features of the present inventions will be apparent from a consideration of the drawings in which.

DETAILED DESCRIPTION OF THE DRAWINGS

Figure 1:
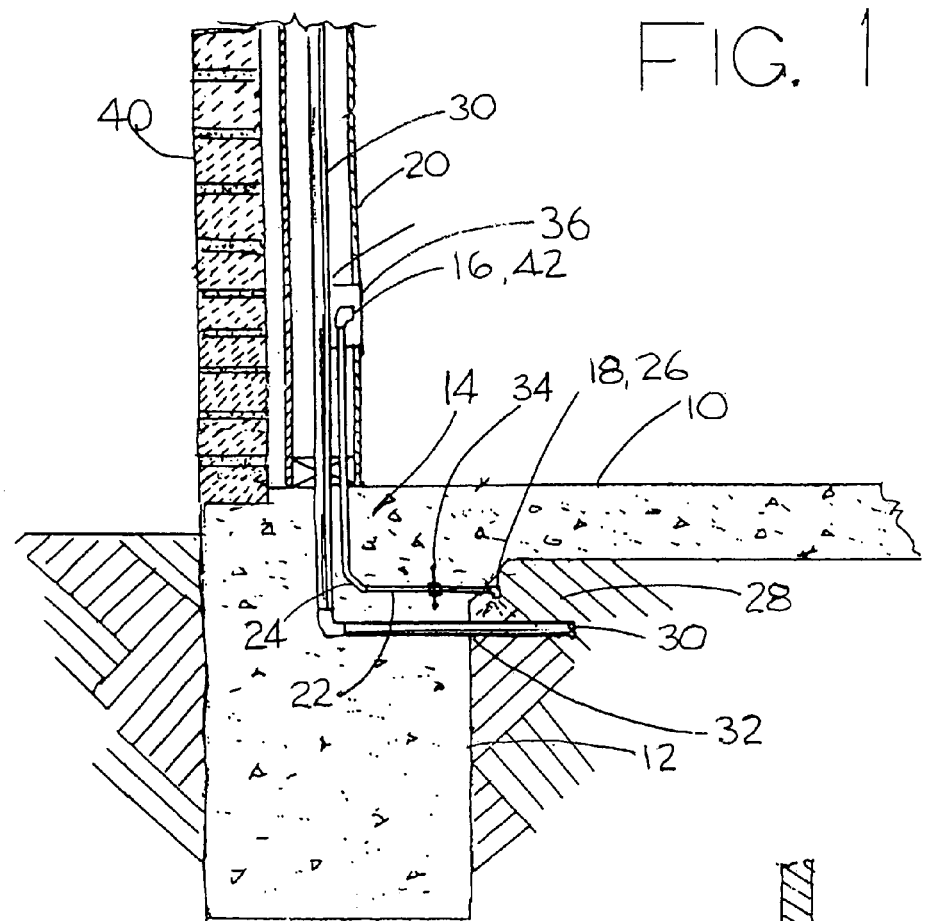
FIG. 1 is a cross-section view of a preferred embodiment of the termiticide dispensing apparatus of the present inventions, taken through the foundation slab perimeter.

The present inventions are described in the following by referring to drawings of examples of how the inventions can be made and used. In these drawings, reference characters are used throughout the views to indicate like or corresponding parts. The embodiments shown and described herein are exemplary. Many construction details are well known in the art, and as such are neither shown nor described.

Figure 2:
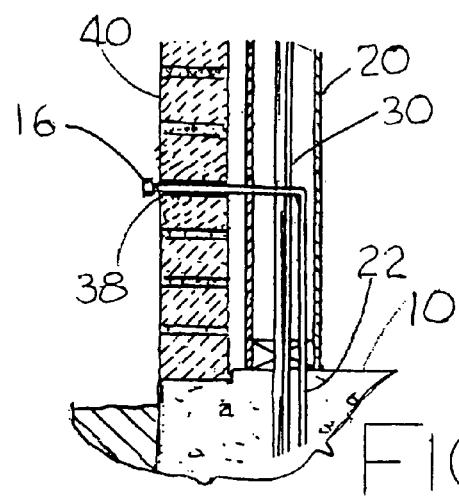
FIG. 2 is a partial cross-section view of an alternative arrangement for the preferred embodiment of FIG. 1.

FIGS. 1 and 2 are cross-section views, taken through the perimeter beam 12 of a typical foundation slab 10, to show the installation of a preferred embodiment of the tubular termiticide dispensing unit 14 of the present inventions. It is important to note that the present invention is adaptable to any style of slab construction, whether it be post-tensioned with interior beams similar to perimeter beam 12, or a conventional slab. Here, inlet end 16 is seen to be located in box 36, for convenient access at the surface of interior wall 20. Alternatively, where accessibility for treatment, short flow path and appearance make it desirable, inlet end 16 may be directed inwardly to extend through exterior wall 40 as described below and shown in FIG. 2. Mid-portion 22 extends downward into slab 10 and may include a ninety degree bend or elbow 24, for directing termiticide from discharge end 18 into underlying fill material 28 near water or drain line 30. In this manner, discharge end 18 is positioned immediately adjacent to potential termite entry point 32 at the underside of slab 10. Discharge end 18 may include directional nozzle 26, for aiming the termiticide flow more directly at entry point 32 or may simply be a plain tubing end for distributing termiticide in a local area.

Treatment providers require any termiticide-dispensing hole in the slab to be positively sealed against chemical leakage into the building interior. For this purpose, the present inventions may further include disk shaped, elastomeric member sealing member 34, as described below and shown in FIGS. 6 and 7. Sealing member 34 acts to seal against any chemical leakage past dispensing unit mid-portion 22.

FIG. 2 shows a cross-section detail view of the installation of the termiticide-dispensing unit 14 of FIG. 1 as it appears when adapted for exterior access. In this case, inlet end 16 is directed outwardly, so as to extend through horizontal or vertical mortar joint 38 of exterior wall 40.

Figure 3:
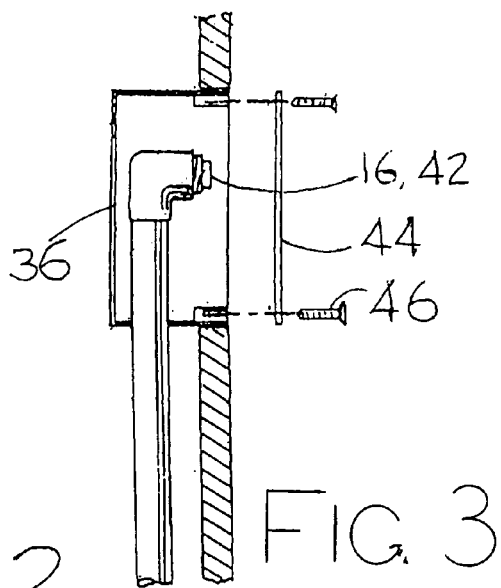
FIG. 3 is an enlarged detail view of the preferred embodiment of FIG. 1.

FIG. 3 shows an enlarged detail view of the interior access 42 provided for termiticide dispensing unit 14. Box 36, the same or similar to electrical switch installation boxes well known in the building construction arts, is located flush with the surface of interior wall 20. Inlet end 16 extends into the interior of box 36 where it is closed with removable closure 42. Cover plate 44, attached with screws 46, encloses inlet end 16 in a cosmetically acceptable manner while allowing ready access for injection of termiticide.

Figure 4:
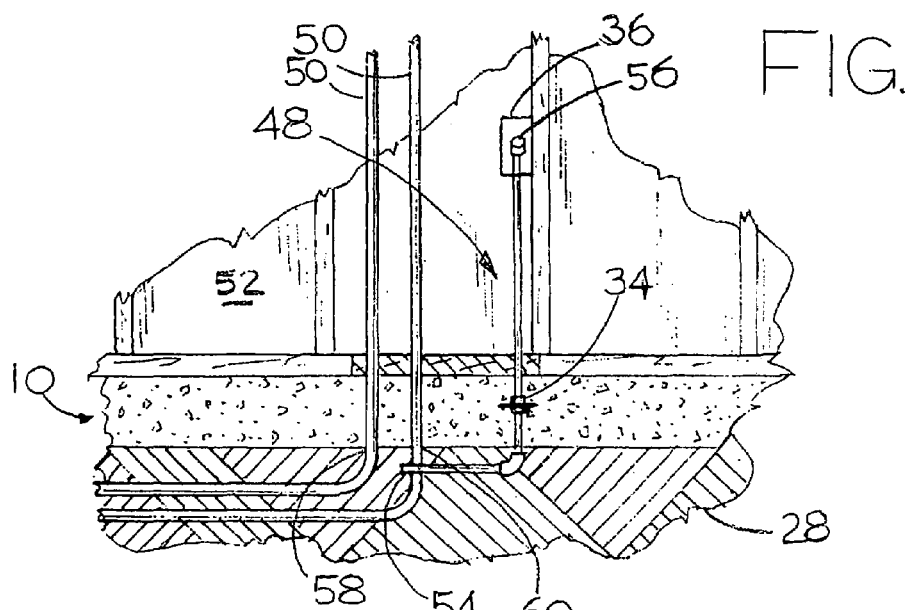
FIG. 4 is a cross-section view of a preferred embodiment of the termiticide dispensing apparatus of the present inventions, taken through the foundation slab interior.

FIG. 4 shows a cross-section detail view of the installation of termiticide dispensing unit 48, with sealing member 34, taken through an interior portion of foundation slab 10. Here, a plurality of closely spaced water or drain lines 50 penetrate slab 10 into underlying fill material 28 and extend upwardly inside of wall 52. Dispensing unit 48 is installed so that discharge end 54 extends into underlying fill material 28, in close proximity to potential termite entry points 58 and 60. As in FIG. 3, inlet end 56 is set in an installation box 30, mounted flush with wall 52. In this manner, single termiticide inlet 56 may be used to effectively treat a plurality of closely grouped termite penetration points.

Figure 5:
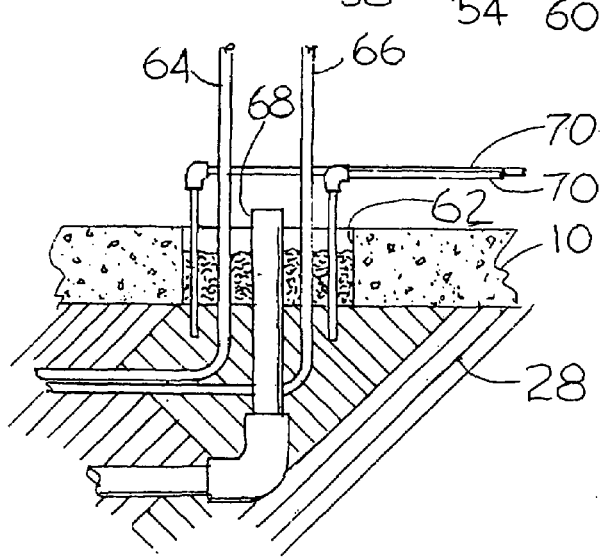
FIG. 5 is a cross-section view of a preferred embodiment of the termiticide dispensing apparatus of the present inventions, taken at through a typical bathtub leave-out.

FIG. 5 is a cross-section view of a typical bathtub leave-out 62, an opening that may be 12" by 12" in slab 10. Leave-out 62 is left to provide flexibility for accommodating a range of plumbing connection locations in commercially available bathtubs. Hot and cold water lines 64 and 66 extend upwardly to connect with unshown control valves and drainpipe 68 is stubbed off at approximately floor level. Since the entire area of leave-out 62 communicates with underlying fill material 28 to allow termite entry, a plurality of dispensing units 70, may be necessitated, according to the size of the leave-out. Thus, dispensing units 70 are placed to discharge termiticide throughout the area of leave-out 62. A suitable, non-hardening or flexible barrier substance, which may be an asphalt based sealant, is packed into the leave-out in order to provide the requisite seal against termiticide migration into the building interior.

Figure 6:
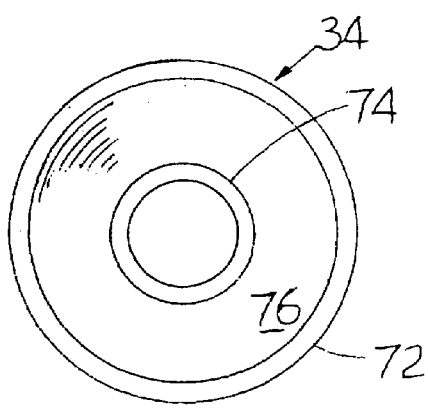
FIG. 6 shows an axial view of the sealing member of the present inventions.
Figure 7:
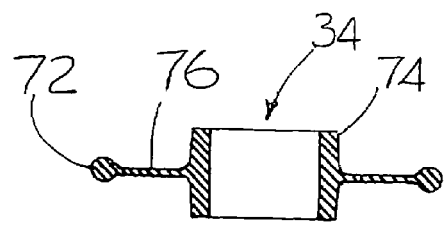
FIG. 7 shows a cross-section view of the sealing member of the present inventions.

FIG. 6 is an axially oriented view of elastomeric sealing member 34, with central collar 74 sized to fit tightly on mid-portion 22. Fitted in this manner, it is imbedded in slab 10 to provide a seal around the body of the tubular dispensing unit 14. The periphery 72 of sealing member 34 is shaped like an "O" ring, joined to central collar 74 by a continuous, thin connecting membrane 76. When imbedded in the slab, the "O" ring shaped sealing member periphery 72 acts to seal against any chemical leakage around the body of a dispensing unit FIG. 7 is a cross-section view of sealing member 34, with tightly fitting collar 74 joined to "O" ring shaped periphery 72 by continuous, thin connecting membrane 76. When imbedded in the slab, the "O" ring shaped sealing member periphery 72 acts to seal against any chemical leakage around the dispensing unit.

The embodiments shown and described above are exemplary. It is not claimed that all of the details, parts, elements, or steps described and shown were invented herein. Even though many characteristics and advantages of the present inventions have been described in the drawings and accompanying text, the description is illustrative only. Changes may be made in the detail, especially in matters of shape, size, and arrangement of the parts within the scope and principles of the inventions. The restrictive description and drawings of the specific examples above do not point out what an infringement of this patent would be, but are to provide at least one explanation of how to use and make the inventions. The limits of the inventions and the bounds of the patent protection are measured by and defined in the following claims.

I claim:

1. In combination with a foundation slab with underlying fill material and having water and drain line penetration points which have water and drain lines penetrating through the foundation slab, an apparatus for dispensing termitcides through the foundation slab to the underlying fill material, at the water and drain line penetration points, consisting of:

at least one individual, non-porous tubular unit, having a first, termiticide receiving end opening and a second termiticide dispensing end opening, for each water or drain line slab penetration point, imbedded in and extending through the foundation slab to the underlying fill material, so that each first end opening is positioned at an accessible point above the slab upper surface and near each respective water or drain line penetration point to receive an individually predetermined and measured quantity of termiticide, wherein the first end opening is not in fluid communication with any other non-porous tubular units at other water and drain line penetration points; and each second end opening is positioned in the underlying fill material to dispense the individually predetermined and measured quantity of termitcide adjacent to each respective water or drain line penetration point.

2. The apparatus of claim 1 and further consisting removable plugs for sealing each first end opening.

3. The apparatus of claim 1 and further consisting a directional nozzle on at least one second end opening.

4. The apparatus of claim 1 and further consisting of:
   an open faced box enclosing each first end opening; and
   a removable cover closing the open face thereof.

5. A method for dispensing termiticides, through a building foundation slab, having water and drain lines that penetrate through the building foundation slab, at water and drain line penetration points, to the underlying and immediately adjacent fill material, consisting of the steps of:

providing, for each water and drain line penetration point, an individual, non-porous tubular unit having a first, receiving end opening, and a second, dispensing end opening, and no other openings, wherein the first end opening is not in fluid communication with any other non-porous tubular units at other water and drain line penetration points;

prior to pouring the foundation slab, securing each tubular unit so that its first end opening will extend above the slab, proximate its respective water or drain line penetration point;

prior to pouring the foundation slab, securing each second end so that it will extend to the underlying fill material adjacent its respective water or drain line penetration point;

pouring and finishing the foundation slab;

clearing each dispensing end opening in turn by injecting an individually predetermined and measured quantity of termiticide through each first, receiving end opening; and dispensing the individually predetermined and measured quantity of termiticide through the respective dispensing end opening into the underlying fill material adjacent the respective water or drain line penetration point.

6. The method of claim 5 and further consisting of the step of sealing each first end opening.

7. The method of claim 5 and further consisting of the steps of enclosing and covering each first end opening.

8. The method of claim 5 and further consisting of the step of guiding the dispensed individually predetermined and measured quantity of termitcide in a predetermined direction.

* * * * *